United States Patent
Derenick et al.

(10) Patent No.: US 10,266,280 B2
(45) Date of Patent: Apr. 23, 2019

(54) COOPERATIVE SAFE LANDING AREA DETERMINATION

(71) Applicant: SIKORSKY AIRCRAFT CORPORATION, Stratford, CT (US)

(72) Inventors: Jason C. Derenick, Hamden, CT (US); Xuchu Ding, Manchester, CT (US); Igor Cherepinsky, Sandy Hook, CT (US); Harshad S. Sane, Southbury, CT (US); Christopher Stathis, Hamden, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 164 days.

(21) Appl. No.: 15/321,006

(22) PCT Filed: Jun. 18, 2015

(86) PCT No.: PCT/US2015/036364
§ 371 (c)(1),
(2) Date: Dec. 21, 2016

(87) PCT Pub. No.: WO2015/200086
PCT Pub. Date: Dec. 30, 2015

(65) Prior Publication Data
US 2017/0197729 A1    Jul. 13, 2017

Related U.S. Application Data

(60) Provisional application No. 62/015,602, filed on Jun. 23, 2014.

(51) Int. Cl.
*B64D 45/04* (2006.01)
*G08G 5/02* (2006.01)
(Continued)

(52) U.S. Cl.
CPC .......... *B64D 45/04* (2013.01); *B64C 39/024* (2013.01); *B64D 45/08* (2013.01); *G01S 13/89* (2013.01);
(Continued)

(58) Field of Classification Search
CPC ...... B64D 45/04; B64D 45/08; B64C 39/024; B64C 2201/024; G01S 13/89;
(Continued)

(56) References Cited

U.S. PATENT DOCUMENTS 6,577,947 B1    6/2003  Kronfeld et al.
7,492,965 B2    2/2009  Blais
(Continued)

FOREIGN PATENT DOCUMENTS

EP    2555072 A2    2/2013

OTHER PUBLICATIONS

International Search Report for International Appln. No. PCT/US2015/036364; Filing Date: Jun. 18, 2015; dated Sep. 4, 2015; 8 pages.
(Continued)

*Primary Examiner* — Mary Cheung
(74) *Attorney, Agent, or Firm* — Cantor Colburn LLP

(57) ABSTRACT

A method of performing a cooperative safe landing area determination includes receiving perception sensor data indicative of conditions at a plurality of potential landing areas. A processing subsystem of a vehicle updates a local safe landing area map based on the perception sensor data. The local safe landing area map defines safe landing area classifications and classification confidences associated with the potential landing areas. One or more remotely-generated safe landing area maps are received from one or more remote data sources. The one or more remotely-generated safe landing area maps correspond to one or more additional
(Continued)

potential landing areas and non-landing areas. The local safe landing area map and the remotely-generated safe landing area maps are aggregated to form a fused safe landing area map. The fused safe landing area map is used to make a final safe landing area determination.

15 Claims, 4 Drawing Sheets

(51) Int. Cl.
*G06K 9/00* (2006.01)
*G08G 5/00* (2006.01)
*B64C 39/02* (2006.01)
*G06K 9/46* (2006.01)
*G06K 9/52* (2006.01)
*G06K 9/62* (2006.01)
*G01S 17/89* (2006.01)
*G01S 17/93* (2006.01)
*G01S 13/89* (2006.01)
*G01S 13/91* (2006.01)
*B64D 45/08* (2006.01)

(52) U.S. Cl.
CPC ............ *G01S 13/913* (2013.01); *G01S 17/89* (2013.01); *G01S 17/933* (2013.01); *G06K 9/0063* (2013.01); *G06K 9/00637* (2013.01); *G06K 9/4604* (2013.01); *G06K 9/52* (2013.01); *G06K 9/6201* (2013.01); *G06K 9/6278* (2013.01); *G08G 5/0013* (2013.01); *G08G 5/0021* (2013.01); *G08G 5/0039* (2013.01); *G08G 5/0056* (2013.01); *G08G 5/0086* (2013.01); *G08G 5/025* (2013.01); *B64C 2201/024* (2013.01)

(58) Field of Classification Search
CPC ...... G01S 17/89; G01S 17/933; G01S 13/913; G08G 5/0039; G08G 5/0056; G08G 5/0021; G08G 5/0013; G08G 5/0086; G08G 5/025; G06K 9/52; G06K 9/6201; G06K 9/00637; G06K 9/6278; G06K 9/4604; G06K 9/0063

See application file for complete search history.

(56) References Cited

U.S. PATENT DOCUMENTS

| 7,769,246 | B2 | 1/2010 | Blais | |
|---|---|---|---|---|
| 8,442,765 | B1 | 5/2013 | Ingvalson | |
| 8,565,944 | B1 | 10/2013 | Gershzohn | |
| 9,177,481 | B2* | 11/2015 | Wang | B64C 19/00 |
| 2008/0154447 | A1 | 6/2008 | Spinelli | |
| 2008/0218384 | A1 | 9/2008 | Varadarajan et al. | |
| 2009/0207020 | A1* | 8/2009 | Garnier | G08B 21/12 340/541 |
| 2010/0121504 | A1* | 5/2010 | Jones | B64D 45/00 701/16 |
| 2010/0204919 | A1 | 8/2010 | Becker et al. | |
| 2010/0332056 | A1 | 12/2010 | Kirk | |
| 2011/0074624 | A1 | 3/2011 | Bunch | |
| 2011/0264312 | A1 | 10/2011 | Spinelli et al. | |
| 2012/0044476 | A1 | 2/2012 | Earhart et al. | |
| 2012/0123669 | A1 | 5/2012 | Shuster | |
| 2012/0176497 | A1 | 7/2012 | Shadmi et al. | |
| 2012/0245844 | A1 | 9/2012 | Lommel et al. | |
| 2012/0323431 | A1* | 12/2012 | Wong | G01C 21/206 701/25 |
| 2013/0127642 | A1 | 5/2013 | Maggiore et al. | |
| 2013/0179059 | A1 | 7/2013 | Otto et al. | |
| 2013/0282208 | A1* | 10/2013 | Mendez-Rodriguez | G01S 17/89 701/16 |

OTHER PUBLICATIONS

Written Opinion of the International Search Authority for International Appln. No. PCT/US2015/036364; International Filing Date: Jun. 18, 2015; dated Sep. 4, 2015; 6 pages.
Communication Pursuant to Rule 164(1) EPC; European Application No. 15811795.2; dated Dec. 19, 2017; 21 Pages.
Extended Search Report; European Application No. 15811795.2; dated May 17, 2018; 23 Pages.

* cited by examiner

COOPERATIVE SAFE LANDING AREA DETERMINATION

CROSS-REFERENCE TO RELATED APPLICATIONS

This application is a National Stage application of PCT/US2015/036364, filed Jun. 18, 2015, which claims the benefit of U.S Provisional Application No. 62/015,602, filed Jun. 23, 2014, both of which are incorporated by reference in their entirety herein.

BACKGROUND OF THE INVENTION

The subject matter disclosed herein generally relates to landing of an aircraft, and more particularly to cooperatively determining a safe landing area for an aircraft.

Optionally-piloted vehicles (OPVs) and unmanned aerial vehicles (UAVs) can operate without a human pilot using autonomous controls. As OPVs and UAVs become more prevalent, they are being operated in less restricted and controlled areas. When OPVs and UAVs are operated autonomously in flight, they must identify a landing area prior to landing. To account for unpredictable landing area conditions, OPVs and UAVs typically use an image-based sensing system to identify geometric factors that may impede a safe landing. A sensing system can be helpful in identifying potentially safe landing areas in close proximity to a vehicle, but the available data values are typically limited to recent observations based on a flight path of the vehicle. Other potentially safe landing areas which were not observed by the vehicle may be preferable; however, without directly observing other potentially safe landing areas, such areas are not typically considered in making a final landing area determination.

BRIEF DESCRIPTION OF THE INVENTION

According to an aspect of the invention, a method of performing a cooperative safe landing area determination includes receiving, at a vehicle, perception sensor data indicative of conditions at a plurality of potential landing areas. A processing subsystem of the vehicle updates a local safe landing area map based on the perception sensor data. The local safe landing area map defines safe landing area classifications and classification confidences associated with the potential landing areas. One or more remotely-generated safe landing area maps are received from one or more remote data sources. The one or more remotely-generated safe landing area maps correspond to one or more additional potential landing areas and non-landing areas. The local safe landing area map is aggregated with the one or more remotely-generated safe landing area maps to form a fused safe landing area map. The fused safe landing area map is used to make a final safe landing area determination.

In addition to one or more of the features described above or below, or as an alternative, further embodiments could include generating a list of ranked landing areas from the fused safe landing area map based on performing a mission-level optimization to order the list of ranked landing areas according to one or more of a mission model and constraints.

In addition to one or more of the features described above or below, or as an alternative, further embodiments could include tagging the local safe area landing map with a freshness indicator.

In addition to one or more of the features described above or below, or as an alternative, further embodiments could include storing the one or more remotely-generated safe landing area maps in a map cache, and sending the local safe area landing map to the one or more remote data sources.

In addition to one or more of the features described above or below, or as an alternative, further embodiments could include determining one or more identifiers and freshness indicators associated with data in the map cache, sending the one or more identifiers and freshness indicators to a second vehicle, receiving a response from the second vehicle indicating desired data based on the one or more identifiers and freshness indicators, and sending the desired data to the second vehicle.

In addition to one or more of the features described above or below, or as an alternative, further embodiments could include where aggregating the local safe landing area map with the one or more remotely-generated safe landing area maps to form the fused safe landing area map further includes computing a combination of the local safe area landing map with the one or more remotely-generated safe landing area maps, and using classification confidence values as weights for overlapping areas.

In addition to one or more of the features described above or below, or as an alternative, further embodiments could include decaying the classification confidence values as time elapses.

In addition to one or more of the features described above or below, or as an alternative, further embodiments could include receiving position data for the vehicle, determining positions of the potential landing areas and the vehicle based on the position data, and correlating the perception sensor data to the position data.

In addition to one or more of the features described above or below, or as an alternative, further embodiments could include exchanging the final safe landing area determination with one or more other vehicles, and verifying that the final safe landing area determination does not conflict with one or more final safe landing area determinations of the one or more other vehicles.

In addition to one or more of the features described above or below, or as an alternative, further embodiments could include performing feature extraction based on the perception sensor data, establishing values for the safe landing area classifications based on matching extracted features from the perception sensor data with expected safe landing characteristics, and adjusting the classification confidences associated with the potential landing areas based on a measurement confidence in the safe landing area classifications.

According to further aspects of the invention, a system is provided for performing a cooperative safe landing area determination. The system includes a processing subsystem and memory having instructions stored thereon that, when executed by the processing subsystem, cause the system to receive perception sensor data indicative of conditions at a plurality of potential landing areas. One or more remotely-generated safe landing area maps are received from one or more remote data sources. The one or more remotely-generated safe landing area maps correspond to one or more additional potential landing areas and non-landing areas. The local safe landing area map is aggregated with the one or more remotely-generated safe landing area maps to form a fused safe landing area map. The fused safe landing area map is used to make a final safe landing area determination.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1A:
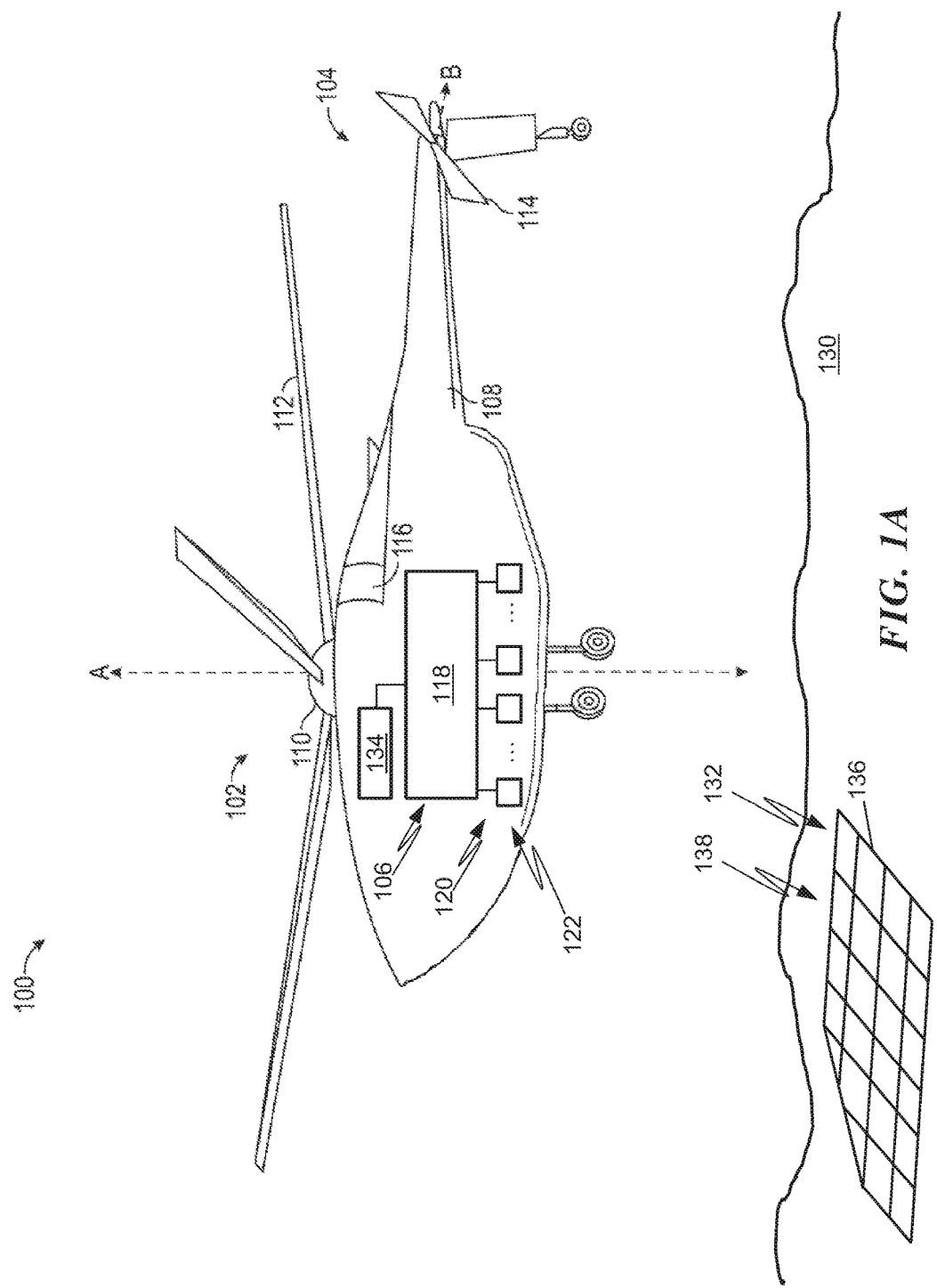
FIG. 1A is a perspective view of an exemplary rotary wing UAV aircraft according to an embodiment of the invention.

In exemplary embodiments, a cooperative safe landing area determination (C-SLAD) is performed for a vehicle using data collected by the vehicle in combination with a group of vehicles. C-SLAD may be implemented for autonomous aircraft, such as optionally-piloted vehicles (OPVs) and unmanned aerial vehicles (UAVs), and/or may be provided to assist in landing area determination for a human-piloted aircraft. Ground-based vehicles, watercraft, and/or spacecraft are other example vehicles that can implement C-SLAD in groups of homogeneous or heterogeneous vehicle types (e.g., aircraft working in combination with one or more ground-based vehicles). In exemplary embodiments, data acquired from perception sensors are used to develop safe landing area (SLA) maps. SLA maps may be cellular/grid-based representations of potential landing area suitability corresponding to environmental terrain which are iteratively built via discrete-time, cell-based feature measurements. SLA maps can be developed using measurements from a variety of perception data sensor types as a two-dimensional probabilistic grid, with each grid cell holding its SLA classification and a measure of confidence in that classification. SLA maps can contain information for identifying landing areas and, dually, hazardous and unsafe landing areas.

In an embodiment, to enable online probabilistic mapping, measurements can be coupled with probabilistic SLA models to support a Bayesian inference. A Bayesian inference is a statistical method of inference that uses Bayes' rule to update probability estimates as additional data values are acquired. Bayes' rule relates the probabilities of conditions before and after an observation. Each cell in a SLA map can be associated with a probability that it represents a safe landing area either in-part (e.g., as part of a larger connected component) or fully. Since each SLA map cell may be assumed to be statistically independent, these probabilities can be readily updated in a parallel fashion.

A SLA map can be designed to integrate higher-order cell-based feature measurement which may be readily computed from temporally correlated, perception sensor data of an individual cell. For example, with a simplified characterization, a safe landing area may be loosely described as being a geospatially "smooth" and "horizontal" surface. High-order feature measurements may be collected using point-based range observations of a particular cell over some fixed-interval of time before computing "slope" and "variance" feature values, for example. Accordingly, each cell in a SLA map can be associated with its own feature vector having values computed over a specified discrete-time interval. Once new feature values are computed for a particular cell, they can be recursively integrated into the SLA map via a standard (or log-odds) Bayesian update, for instance. Using the probability values of a SLA map, safe landing areas can be extracted and ordered into a ranked list according to probability values and other factors, such as a mission model and/or other constraints.

A processing system or subsystem of a vehicle can develop its own local SLA map based upon locally observed sensor data. When operating as part of a team of vehicles, such as multiple autonomous vehicles, each local SLA map is a partial SLA map relative to other partial SLA maps produced by other vehicles. Each vehicle in a team or group can produce a SLA map based on sensor data from areas visited. The vehicles can share their respective partial SLA maps such that data in the partial SLA maps can be fused to form a larger-scale fused SLA map. Whenever a vehicle shares its own map with a communicating peer, it may attach a timestamp or sequence number with its SLA map to serve as an indicator of "freshness" in the receiver's map cache. The receiver can store each received SLA map in a separate buffer and aggregate them whenever global or wide-scale information is needed.

When a vehicle is able to communicate with a teammate, the pair can exchange their respective partial SLA maps and any other SLA maps that they have received from other teammates during the course of their travels (i.e., their respective map caches). To reduce communication overhead, prior to exchanging map caches the vehicles can share unique identifiers of the teammates whose SLA maps they have cached as well as the corresponding timestamp or sequence number. Whenever one vehicle has an older version of a particular teammate's SLA map, it can request new SLA map data from the communicating peer. Similarly, if a vehicle determines that its peer has cached data from a teammate the vehicle has not yet encountered, that data can be requested as well.

To generate a fused SLA map given a collection of partial SLA maps, a vehicle can compute a combination of a subset or all of the SLA maps it has cached corresponding to a wider area to be considered. Each cell's weight in each SLA map can be determined by a confidence value in its classification as a SLA or not a SLA. Generation of the fused SLA map may happen periodically at a fixed rate for the vehicle to compute most likely landing sites accordingly as dictated by constraints and mission-level objectives. Note that although computations can be performed over a potentially large SLA map, parallel processing may be used to decrease processing latency.

Mission-level optimizations for each vehicle may be performed to select a best SLA given its task and/or its role in the team. Depending upon the application, it may be feasible for one vehicle to be mapped to the same landing site as another. To mitigate this risk, the team can employ a negotiation protocol to assure that landing sites are uniquely, but still optimally, assigned. Such a protocol can be readily defined and implemented with varying levels of sophistication.

Referring now to the drawings, FIG. 1A illustrates a perspective view of an exemplary vehicle in the form of an autonomous rotary-wing unmanned aerial vehicle (UAV) 100 (also referred to as "autonomous UAV 100" or "aircraft 100") for implementing cooperative safe landing area determination (C-SLAD) according to an embodiment of the invention. As illustrated, the autonomous UAV 100 is an aircraft that includes a main rotor system 102, an anti-torque system, for example, a tail rotor system 104, and a C-SLAD system 106. The main rotor system 102 is attached to an airframe 108 and includes a rotor hub 110 having a plurality of blades 112 that rotate about axis A. Also, the tail rotor system 104 is attached aft of the main rotor system 102 and includes a plurality of blades 114 that rotate about axis B (which is orthogonal to axis A). The main rotor system 102 and the tail rotor system 104 are driven to rotate about their respective axes A, B by one or more turbine engines 116 through gearboxes (not shown). Although a particular configuration of an autonomous UAV 100 is illustrated as a rotary wing UAV and described in the disclosed embodiments, it will be appreciated that other configurations and/or machines include autonomous, semi-autonomous, and human-controlled vehicles that may operate in land or water including fixed-wing aircraft, rotary-wing aircraft, marine vessels (e.g., submarines, ships, etc.), and land vehicles (e.g., trucks, cars, etc.) for docking, parking, or autonomous positioning may also benefit from embodiments disclosed.

The C-SLAD system 106 includes a computer system 118 having one or more processing resources and memory to process sensor data acquired from a perception sensing system 120. The perception sensing system 120 may be attached to or incorporated within the airframe 108. The perception sensing system 120 includes one or more perception sensors 122. The computer system 118 is a vehicle-based computer system that processes, in one non-limiting embodiment, raw data acquired through the perception sensing system 120 while the autonomous UAV 100 is airborne.

The perception sensors 122 can capture perception sensor data of a terrain 130. In an embodiment, the perception sensors 122 may include one or more of: a downward-scanning LIDAR scanner, a video camera, a multi-spectral camera, a stereo camera system, a structure light-based 3D/depth sensor, a time-of-flight camera, a LADAR scanner, a RADAR scanner, or the like in order to capture perception sensor data indicative of the terrain 130 which may cover two or more spectral ranges. Additionally, the autonomous UAV 100 may include a navigation system 134, such as, for example, an inertial measurement unit (IMU) that may be used to acquire positional data related to a current rotation and acceleration of the autonomous UAV 100 in order to determine a geographic location of autonomous UAV 100, including a change in position of the autonomous UAV 100. The navigation system 134 can also or alternatively include a global positioning system (GPS) or the like to enhance a positional awareness of the autonomous UAV 100. The navigation system 134 in combination with the perception sensor data may be used to determine positions or geographic locations of potential landing areas 132.

In exemplary embodiments, the computer system 118 of the C-SLAD system 106 observes the terrain 130 and determines current conditions at the potential landing areas 132 for the autonomous UAV 100. A grid 136 subdivides the potential landing areas 132 into a plurality of cells 138 for analysis. The grid 136 may exist as a data structure in the computer system 118, with sizing and geographic coordinates defined across an area of the terrain 130 to be observed using the perception sensors 122. Perception sensor data for the cells 138 can be collected over a period of time. Using feature extraction for visual information and/or depth information, a local safe landing area map can be developed and updated based on correlating extracted features of the perception sensor data with a probabilistic safe landing area model. The computer system 118 may compute slope and variance feature values of the cells 138 based on the perception sensor data that are collected over a period of time. The characterizations in the local SLA map can indicate a relative confidence that an area includes a smooth and horizontal surface at an expected elevation level. The cells 138 and the grid 136 can be formatted to support arbitrary dimensions and need not be uniformly defined with constant area values.

Figure 1B:
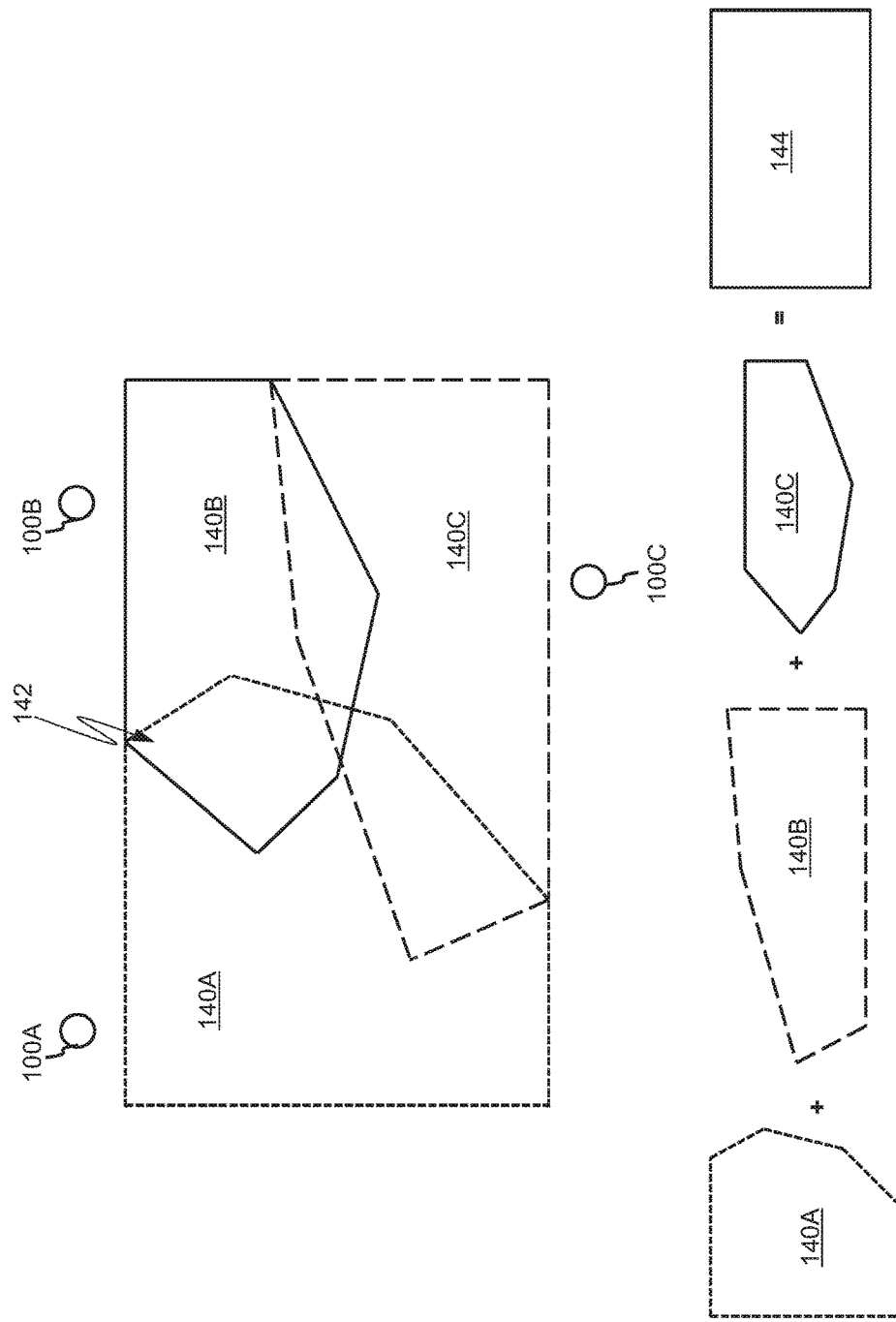
FIG. 1B depicts an example of overlapping partial safe landing area maps used to form a fused safe landing area map.

FIG. 1B depicts an example of overlapping partial safe landing area maps used to form a fused safe landing area map. In the example of FIG. 1B, multiple vehicles 100A, 100B, and 100C each respectively form partial SLA maps 140A, 140B, and 140C as grids of cells locally observed. Accordingly, with respect to vehicle 100A, partial SLA map 140A is a local SLA map and partial SLA maps 140B and 140C are remotely-generated SLA maps. With respect to vehicle 100B, partial SLA map 140B is a local SLA map and partial SLA maps 140A and 140C are remotely-generated SLA maps. Similarly, with respect to vehicle 100C, partial SLA map 140C is a local SLA map and partial SLA maps 140A and 140B are remotely-generated SLA maps. Overlapping areas 142 are portions of the SLA maps 140A-140C that overlap at least in part. The non-overlapping areas of the partial SLA maps 140A-140C represent various potential landing areas and additional potential landing areas, as well as non-landing areas. Communication between vehicles 100A-100C enables exchange of the partial SLA maps 140A-140C such that each of the vehicles 100A-100C can aggregate the partial SLA maps 140A-140C to form a fused SLA map 144. The vehicles 100A-100C can be any combination of air, land, space, or water based vehicles, and may include a greater or lesser number of vehicles than that depicted in FIG. 1B.

Figure 2:
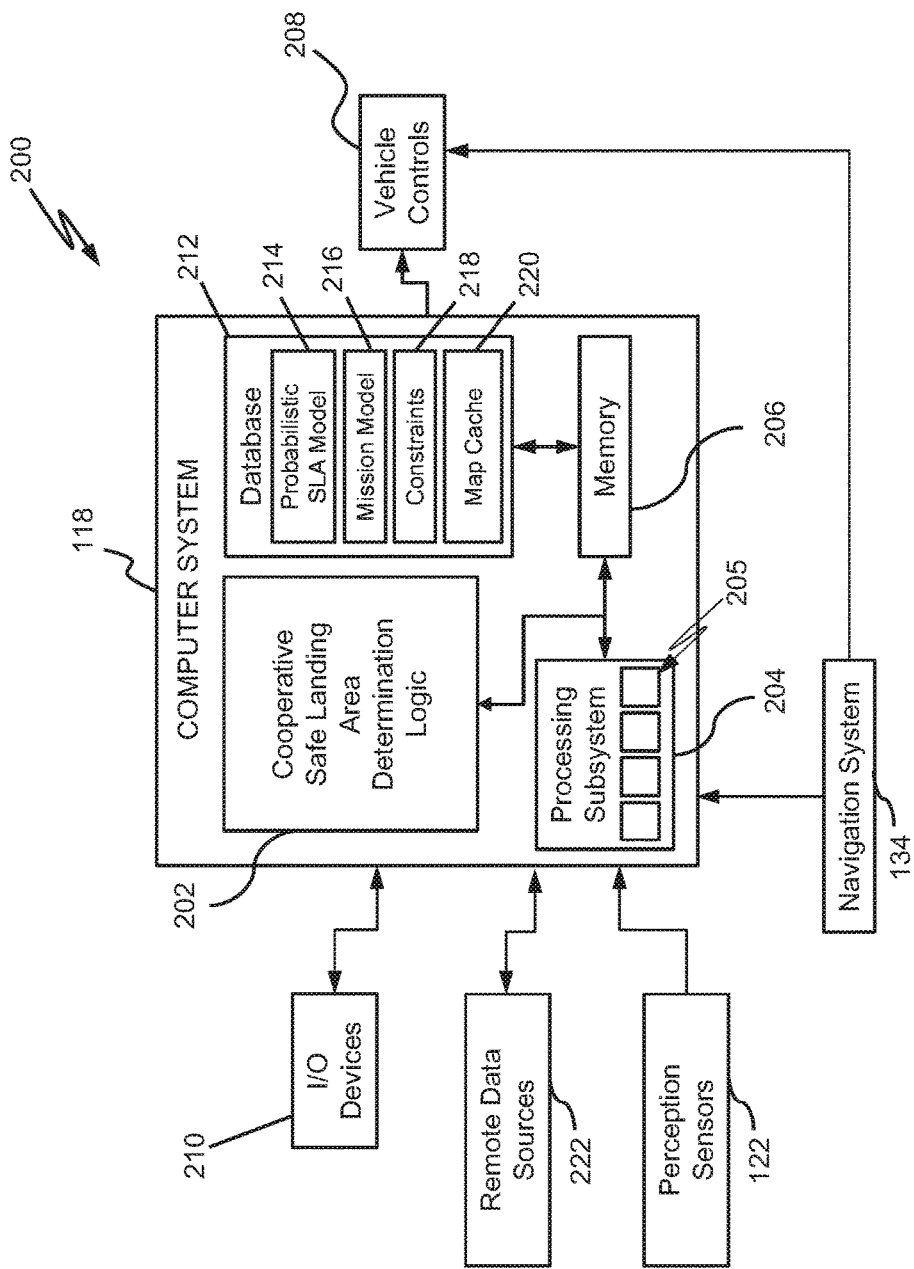
FIG. 2 is a schematic view of an exemplary computing system according to an embodiment of the invention.

FIG. 2 illustrates a schematic block diagram of a system 200 for C-SLAD onboard the autonomous UAV 100 of FIG. 1A according to an exemplary embodiment. The system 200 is an embodiment of the C-SLAD system 106 of FIG. 1A. As illustrated, the system 200 includes the computer system 118 that executes instructions for implementing C-SLAD logic 202. The computer system 118 receives perception sensor data indicative of conditions at potential landing areas 132 of FIG. 1A from one or more perception sensors 122, which may cover multiple spectral ranges. As depicted in FIG. 2, the computer system 118 includes a memory 206 that communicates with a processing subsystem 204. The memory 206 may store the C-SLAD logic 202 as executable instructions that are executed by the processing subsystem 204. The memory 206 is an example of a non-transitory computer readable storage medium tangibly embodied in the computer system 118 including executable instructions stored therein, for instance, as firmware. Also, in embodiments, memory 206 may include random access memory (RAM), read-only memory (ROM), or other electronic, optical, magnetic or any other computer readable medium onto which instructions and data are stored. The processing subsystem 204 may include any number and type of processors, including a general purpose processor, a digital signal processor, a microcontroller, an application specific integrated circuit, a field programmable gate array, or the like. In an exemplary embodiment, the processing subsystem 204 include a plurality of processing resources 205, which may be separate cores or processing circuits supporting parallel computing. Although depicted as singular blocks, the processing subsystem 204 and memory 206 can be distributed between multiple processing circuits and memory subsystems. In an embodiment, the processing subsystem 204 performs additional processing tasks for the system 200.

The system 200 may include a database 212. The database 212 may be used to store a probabilistic SLA model 214, a mission model 216, constraints 218, a map cache 220, and the like. The probabilistic safe landing area model 214 can define probabilities that terrain features are suitable for safe landing of the autonomous UAV 100 of FIG. 1. The mission model 216 may define mission-level details, such as preferred routes, targets, obstacles, and the like. The constraints 218 may define costs, known operating parameters, limits of the autonomous UAV 100 of FIG. 1, and other known values. The map cache 220 can hold various SLA maps including a local SLA map, one or more remotely generated SLA maps, such as the partial SLA maps 140A-140C of FIG. 1B, and a fused SLA map (e.g., fused SLA map 144 of FIG. 1B). The data stored in the database 212 may be based on one or more other algorithms or processes for implementing the C-SLAD logic 202. For example, in some embodiments data stored in the database 212 may be a result of the processing subsystem 204 having subjected data received from the perception sensors 122 and other sensors (not depicted) to one or more filtration processes. The database 212 may be used for any number of reasons. For example, the database 212 may be used to temporarily or permanently store data, to provide a record or log of the data stored therein for subsequent examination or analysis, etc. In some embodiments, the database 212 may store a relationship between data, such as one or more links between data or sets of data acquired through the modalities onboard the autonomous UAV 100 of FIG. 1A.

The system 200 may provide one or more controls, such as vehicle controls 208. The vehicle controls 208 may provide directives based on, e.g., data associated with the navigation system 134. Directives provided by the vehicle controls 208 may include navigating or positioning the autonomous UAV 100 of FIG. 1A to a safe landing area. The directives may be presented on one or more input/output (I/O) devices 210. The I/O devices 210 may include a display device or screen, audio speakers, a graphical user interface (GUI), etc. In some embodiments, the I/O devices 210 may be used to enter or adjust a linking between data or sets of data. It is to be appreciated that the system 200 is illustrative. In some embodiments, additional components or entities not shown in FIG. 2 may be included. In some embodiments, one or more of the components or entities may be optional. In some embodiments, the components or entities of the system 200 may be arranged or configured differently from what is shown in FIG. 2. For example, in some embodiments the I/O device(s) 210 may be commanded by vehicle controls 208, as opposed to being commanded by the processing subsystem 204.

The system 200 also supports a data exchange with one or more remote data sources 222. The remote data sources 222 can be other vehicles. For example, with respect to the vehicle 100A of FIG. 1B, vehicles 100B and/or 100C of FIG. 1B can be the remote data sources 222.

Figure 3:
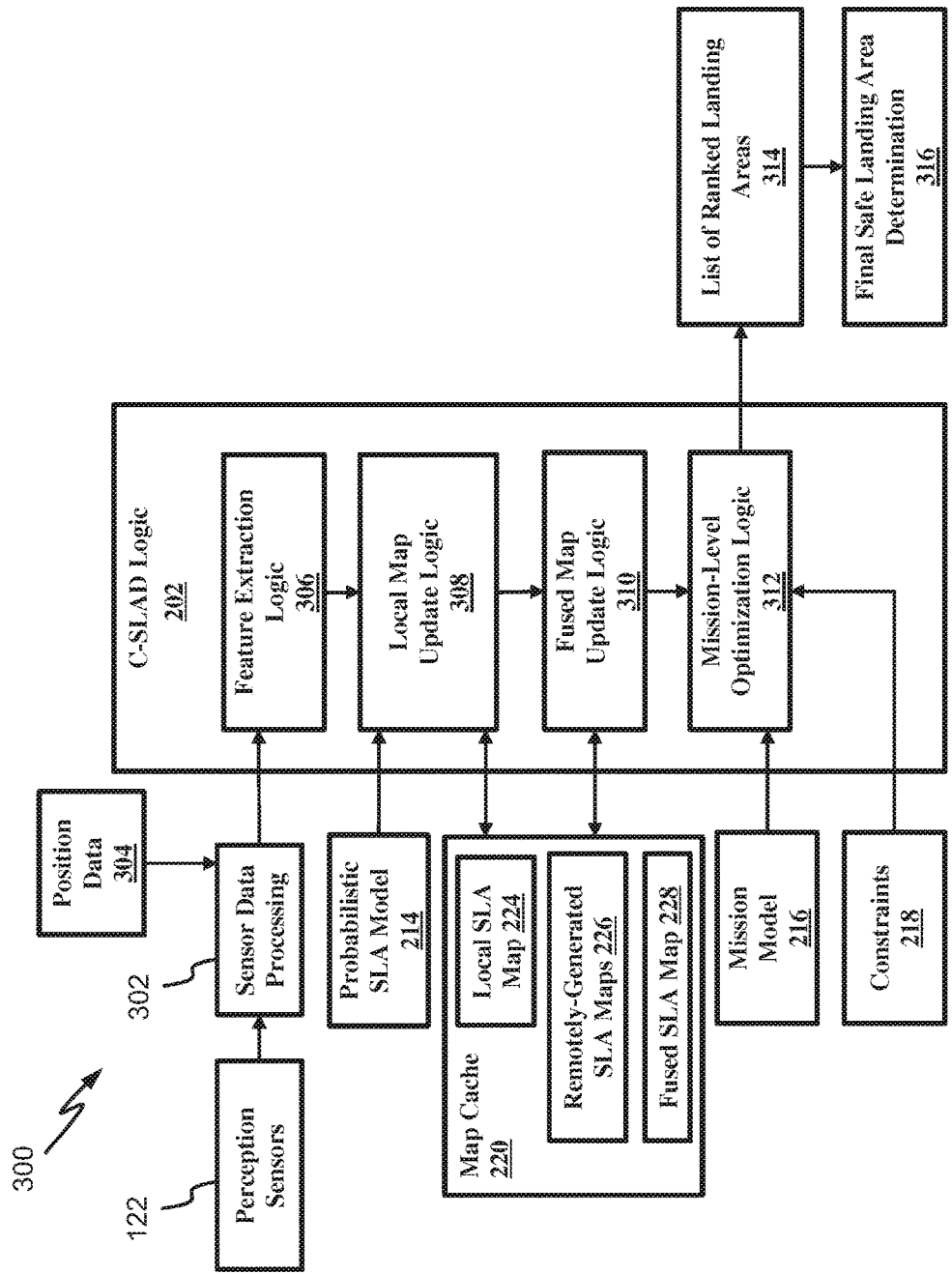
FIG. 3 illustrates a dataflow diagram for cooperative safe landing area determination according to an embodiment of the invention.

FIG. 3 illustrates an exemplary data flow diagram 300 that is performed by the processing subsystem 204 of FIG. 2 for implementing the C-SLAD logic 202. Perception sensor data indicative of current conditions at potential landing areas 132 of FIG. 1A for the autonomous UAV 100 of FIG. 1A are received at sensor data processing 302 from the perception sensors 122. The sensor data processing 302 may also receive position data 304, for example, from the navigation system 134 of FIGS. 1A and 2. The position data 304 received for the autonomous UAV 100 of FIG. 1A may be used to determine positions of the potential landing areas 132 of FIG. 1A and the autonomous UAV 100 of FIG. 1A. The perception sensor data from the perception sensors 122 can be correlated to the position data 304 to determine physical alignment between sensor data and geospatial positions of the grid 136 of FIG. 1A. In an exemplary embodiment, the C-SLAD logic 202 includes feature extraction logic 306, local map update logic 308, fused map update logic 310, and mission-level optimization logic 312; however, it will be understood that the mission-level optimization logic 312 may be omitted or combined with other logic.

The sensor data processing 302 can provide the perception sensor data to the feature extraction logic 306. The feature extraction logic 306 performs feature extraction on the perception sensor data. The feature extraction logic 306 may perform known detection techniques to identify or filter out features. For example, pattern matching using a scale-invariant feature transform can search for specific shapes. Depth data can be checked for substantial uniformity over geospatial locations. Data sets defining planes of different spectral ranges over the same geospatial area may be used for feature extraction and increased confidence in safe landing zone vs. unsafe landing zone determinations. For instance, a road may visually have a substantially rectangular appearance defined by observed edges and may have a substantially smooth surface defined by depth measurements. Using a grid, such as the grid 136 of FIG. 1A, data processing in the processing subsystem 204 of FIG. 2 can be partitioned according to the cells 138 of FIG. 1A as separate observation areas for analysis. Accordingly, as multi-spectral sensor data for the cells 138 of FIG. 1A are collected over a period of time, values such as slope and variance feature values of the cells 138 of FIG. 1A can be computed.

The local map update logic 308 can update a local SLA map 224 based on correlating extracted features of the perception sensor data with the probabilistic safe landing area model 214. Probabilistic values in the local SLA map 224 may be updated using a Bayesian inference relative to features extracted from the perception sensor data in an embodiment. Alternatively, other classification techniques known in the art can be used to establish whether geospatial locations associated with cells forming the local SLA map 224 are classified as safe landing areas or unsafe landing areas in combination with a classification confidence.

In an exemplary embodiment, the processing subsystem 204 of FIG. 2 of the autonomous UAV 100 of FIG. 1A can update the local SLA map 224 based on perception sensor data from the perception sensors 122. The local SLA map 224 may include a grid of cells, such as the grid 136 of cells 138 of FIG. 1A, that hold safe landing area classifications and classification confidences associated with potential landing areas, such as potential landing areas 132 of FIG. 1A. Values for the safe landing area classifications can be established based on matching extracted features from the perception sensor data with expected safe landing characteristics on a cell basis. The classification confidences associated with the potential landing areas may be adjusted based on a measurement confidence in the safe landing area classifications on a cell basis. Measurement confidence can be increased by collecting a larger number of samples over a same area with a temporal correlation. For example, using a combination of LIDAR and video images for a same area can increase classification confidence when similar features are detected and extracted using different sensor types at about the same time. Additionally, a higher classification confidence may be associated with higher resolution sensors as opposed to lower resolution sensors. Areas observed in closer proximity may also have a higher classification confidence, as a greater degree of detail can be observed.

Upon updating the local SLA map 224, it can be tagged with a freshness indicator, stored in the map cache 220, and made available to the fused map update logic 310. The freshness indicator can be a timestamp or sequence number. The fused map update logic 310 can also access one or more remotely-generated SLA maps 226 stored in the map cache 220. The one or more remotely-generated SLA maps 226 are received from the one or more remote data sources 222 of FIG. 2, such as other vehicles. The one or more remotely-generated SLA maps 226 correspond to one or more additional potential landing areas and non-landing areas that may overlap with potential landing areas 132 of FIG. 1A, such as the partial SLA maps 140A-140C and overlapping areas 142 depicted in FIG. 1B. The fused map update logic 310 aggregates the local SLA map 224 with the one or more remotely-generated SLA maps 226 to form a fused SLA map 228, such as the fused SLA map 144 of FIG. 1B. The local SLA map 224 can also be sent to the one or more remote data sources 222 of FIG. 2, such that other vehicles can also create fused SLA maps.

When exchanging SLA maps from the map cache 220 between vehicles, one or more identifiers and freshness indicators associated with data in the map cache 220 can be determined to summarize locally stored contents of the map cache 220. Freshness indicators may include timestamps and/or sequence numbers. The one or more identifiers and freshness indicators can be sent to a second vehicle in communication with the autonomous UAV 100 of FIG. 1A. For example, the autonomous UAV 100 of FIG. 1A can be an embodiment of vehicle 100A of FIG. 1B and may communicate with vehicle 100B of FIG. 1B as the second vehicle and/or vehicle 100C of FIG. 1B as the second vehicle. The second vehicle can compare the received identifiers and freshness indicators to determine whether the autonomous UAV 100 of FIG. 1A has different or newer/fresher data which can be requested. A response may be received from the second vehicle that indicates desired data based on the one or more identifiers and freshness indicators. The autonomous UAV 100 of FIG. 1A can then send the desired data to the second vehicle.

Aggregation of the local SLA map 224 with the one or more remotely-generated SLA maps 226 can include computing a linear or non-linear combination of the local SLA map 224 with the one or more remotely-generated SLA maps 226. Classification confidence values may be used as weights for overlapping areas, such as overlapping areas 142 of FIG. 1B, when combining the data. The freshness of the data can also be taken into account in determining classification confidence. For example, classification confidence values can decay as time elapses since changes in landing area conditions are more likely to occur as more time passes.

The C-SLAD logic 202 can generate a list of ranked landing areas 314 based on the fused SLA map 228. Values in the fused SLA map 228 may be compared to a threshold level indicative of a safe landing area. Safe landing areas for the list of ranked landing areas 314 may be identified based on extracting cells from the fused SLA map 228 that exceed the threshold level. Alternatively or in combination with threshold level comparison, values in the fused SLA map 228 can be sorted and most likely candidates for the list of ranked landing areas 314 selected based on the sorting of the values. A highest ranked landing area in the list of ranked landing areas 314 can be used to the make a final safe landing area determination 316. To ensure that there is no conflict in final landing area selection between multiple vehicles, the final safe landing area determination 316 can be exchanged with one or more other vehicles. Thus, the vehicles, such as vehicles 100A-100C of FIG. 1B, can verify that the final safe landing area determination 316 does not conflict with one or more final safe landing area determinations of the one or more other vehicles. If a conflict is detected, a negotiation protocol can be employed to resolve the conflict. For instance, vehicles may exchange a number of values from the list of ranked landing areas 314 and determine the minimum impact by selecting a lower ranked landing area for one of the conflicted vehicles while also ensuring that a new conflict does not arise based on the change.

As part of generating the list of ranked landing areas 314, the mission-level optimization logic 312 can also perform a mission-level optimization to order the list of ranked landing areas 314 according to one or more of a mission model 216 and constraints 218. Depending upon preferences and limitations defined in the mission model 216 and/or constraints 218, adjustments to ordering in the list of ranked landing areas 314 can be made to raise or lower respective rankings.

Technical effects include performing a cooperative safe landing area determination for one or more vehicles. Vehicles can form partial safe landing area maps and exchange data to enable the vehicles to form a fused safe landing area map that extends beyond potential landing areas locally observed at each vehicle.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of performing a cooperative safe landing area determination, the method comprising:
    receiving, at a vehicle, perception sensor data indicative of conditions at a plurality of potential landing areas;
    updating, by a processing subsystem of the vehicle, a local safe landing area map based on the perception sensor data, the local safe landing area map defining safe landing area classifications and classification confidences associated with the potential landing areas;
    receiving one or more remotely-generated safe landing area maps from one or more remote data sources, the one or more remotely-generated safe landing area maps corresponding to one or more additional potential landing areas and non-landing areas;
    aggregating the local safe landing area map with the one or more remotely-generated safe landing area maps to form a fused safe landing area map; and
    using the fused safe landing area map to make a final safe landing area determination, wherein using the fused safe landing area map to make a final safe landing area determination includes extracting one or more cells from a plurality of cells of the fused safe landing area map, a value of the one or more cells exceeding a threshold level indicative of a safe landing area.

2. The method of claim 1, further comprising:
    generating a list of ranked landing areas from the fused safe landing area map based on performing a mission-level optimization to order the list of ranked landing areas according to one or more of a mission model and constraints.

3. The method of claim 1, further comprising:
tagging the local safe area landing map with a freshness indicator.

4. The method of claim 1, further comprising:
storing the one or more remotely-generated safe landing area maps in a map cache; and sending the local safe area landing map to the one or more remote data sources.

5. The method of claim 4, further comprising:
determining one or more identifiers and freshness indicators associated with data in the map cache;
sending the one or more identifiers and freshness indicators to a second vehicle;
receiving a response from the second vehicle indicating desired data based on the one or more identifiers and freshness indicators; and
sending the desired data to the second vehicle.

6. The method of claim 1, wherein aggregating the local safe landing area map with the one or more remotely-generated safe landing area maps to form the fused safe landing area map further comprises:
computing a combination of the local safe area landing map with the one or more remotely-generated safe landing area maps; and
using classification confidence values as weights for overlapping areas.

7. The method of claim 6, further comprising:
decaying the classification confidence values as time elapses.

8. The method of claim 1, further comprising:
receiving position data for the vehicle;
determining positions of the potential landing areas and the vehicle based on the position data; and
correlating the perception sensor data to the position data.

9. The method of of claim 1, further comprising:
exchanging the final safe landing area determination with one or more other vehicles; and
verifying that the final safe landing area determination does not conflict with one or more final safe landing area determinations of the one or more other vehicles.

10. The method of claim 1, further comprising:
performing feature extraction based on the perception sensor data;
establishing values for the safe landing area classifications based on matching extracted features from the perception sensor data with expected safe landing characteristics; and
adjusting the classification confidences associated with the potential landing areas based on a measurement confidence in the safe landing area classifications.

11. A system for performing a cooperative safe landing area determination, the system comprising:
a processing subsystem; and
memory having instructions stored thereon that, when executed by the processing subsystem, cause the system to:
receive perception sensor data indicative of conditions at a plurality of potential landing areas;
update a local safe landing area map based on the perception sensor data, the local safe landing area map defining safe landing area classifications and classification confidences associated with the potential landing areas;
receive one or more remotely-generated safe landing area maps from one or more remote data sources, the one or more remotely-generated safe landing area maps correspond to one or more additional potential landing areas and non-landing areas;
aggregate the local safe landing area map with the one or more remotely-generated safe landing area maps to form a fused safe landing area map; and
use the fused safe landing area map to make a final safe landing area determination, wherein use of the fused safe landing area map to make a final safe landing area determination includes extracting one or more cells from a plurality of cells of the fused safe landing area map, a value of the one or more cells exceeding a threshold level indicative of a safe landing area.

12. The system of claim 11, wherein the memory further comprises instructions stored thereon that, when executed by the processing subsystem, cause the system to:
store the one or more remotely-generated safe landing area maps in a map cache; and
send the local safe area landing map to the one or more remote data sources.

13. The system of claim 11, wherein the system is a computer system of a vehicle, and the memory further comprises instructions stored thereon that, when executed by the processing subsystem, cause the system to:
determine one or more identifiers and freshness indicators associated with data in the map cache;
send the one or more identifiers and freshness indicators to a second vehicle;
receive a response from the second vehicle indicating desired data based on the one or more identifiers and freshness indicators; and
send the desired data to the second vehicle.

14. The system of claim 11, wherein aggregation of the local safe landing area map with the one or more remotely-generated safe landing area maps to form the fused safe landing area map further comprises:
computation of a combination of the local safe area landing map with the one or more remotely-generated safe landing area maps; and
use of classification confidence values as weights for overlapping areas.

15. The system of claim 11, wherein the memory further comprises instructions stored thereon that, when executed by the processing subsystem, cause the system to:
perform feature extraction based on the perception sensor data;
establish values for the safe landing area classifications based on matching extracted features from the perception sensor data with expected safe landing characteristics; and
adjust the classification confidences associated with the potential landing areas based on a measurement confidence in the safe landing area classifications.

* * * * *